(12) United States Patent
Sekiguchi et al.

(10) Patent No.: US 12,712,954 B2
(45) Date of Patent: Aug. 18, 2026

(54) METHOD AND APPARATUS FOR EXTERNAL APPEARANCE INSPECTION OF MOBILE TERMINAL

(71) Applicant: Eco-Movement, Inc., Tokyo (JP)

(72) Inventors: Toshihiro Sekiguchi, Tokyo (JP); Masahiro Ishizaka, Tokyo (JP); Nozomi Harada, Tokyo (JP)

(73) Assignee: Eco-Movement, Inc., Tokyo (JP)

( * ) Notice: Subject to any disclaimer, the term of this patent is extended or adjusted under 35 U.S.C. 154(b) by 188 days.

(21) Appl. No.: 18/711,281

(22) PCT Filed: Apr. 26, 2024

(86) PCT No.: PCT/JP2024/016366

§ 371 (c)(1),
(2) Date: May 17, 2024

(87) PCT Pub. No.: WO2025/057473

PCT Pub. Date: Mar. 20, 2025

(65) Prior Publication Data

US 2026/0172495 A1 Jun. 18, 2026

(30) Foreign Application Priority Data

Sep. 14, 2023 (JP) ................................ 2023-148959

(51) Int. Cl.

| | |
|---|---|
| ***H04N 23/611*** | (2023.01) |
| ***H04M 1/02*** | (2006.01) |
| ***H04N 23/60*** | (2023.01) |
| ***H04N 23/62*** | (2023.01) |

(52) U.S. Cl.

CPC .......... *H04M 1/0264* (2013.01); *H04N 23/60* (2023.01); *H04N 23/611* (2023.01); *H04N 23/62* (2023.01)

(58) Field of Classification Search

None

See application file for complete search history.

(56) References Cited

U.S. PATENT DOCUMENTS

2016/0097726 A1* 4/2016 Ahn ....................... G01N 21/95 356/237.1
2020/0132438 A1* 4/2020 Hayata ............... G01B 11/0608
2022/0107280 A1* 4/2022 Ohira ................ G01N 23/2251

FOREIGN PATENT DOCUMENTS

JP 2022-539909 A 9/2022
JP 2022-539912 A 9/2022

* cited by examiner

*Primary Examiner* — Edward Park
(74) *Attorney, Agent, or Firm* — WHDA, LLP

(57) ABSTRACT

The method for external appearance inspection of a terminal T includes: using a camera 6 being placed to face a front surface or a back surface of a terminal T; capturing images of both left and right side surfaces, an upper surface, and upper left and right corner portions of the terminal, and simultaneously imaging the front surface or the back surface of the terminal. The mirrors 11 to respectively corresponds to both the left and right side surfaces, the upper surface, and the upper left and right corner portions of the terminal. The mirrors each are arranged with a reflective surface being inclined outward with respect to an optical axis of a photographing lens 6L of the camera; and inverting the placed terminal in its up-down direction after the imaging, and imaging the terminal in this posture using the camera.

8 Claims, 3 Drawing Sheets

METHOD AND APPARATUS FOR EXTERNAL APPEARANCE INSPECTION OF MOBILE TERMINAL

TECHNICAL FIELD

The present invention relates to external appearance inspection of mobile terminals (hereinafter referred to as "terminals") such as mobile phones and tablets.

BACKGROUND ART

Used terminals such as smartphones are collected by trade-ins or purchases at retail stores, etc., undergo a recycling process such as data erasure, functional inspection, external appearance inspection and necessary parts replacement, and are supplied to the market as products called second-hand smartphones or the like.

It is known that, in the market price of a recycled terminal, the functional quality and external appearance condition plays a large part in determining the price, in addition to the price factors such as manufacturer, year, model, and performance.

For this reason, in the recycling process of used terminals, importance is placed on functional inspection and external appearance inspection, and specialized automatic inspection apparatuses have been proposed.

However, since the specialized automatic inspection apparatuses proposed in Patent Literatures 1 and 2 are automatic type used in recycling factories, the apparatuses have complicated and large structure, and involve large-scale installation. Therefore, the apparatuses have not been available for use at retail stores.

In particular, in conventional external appearance inspection of used terminals, the external appearance of the terminal is imaged with a camera, and the image data is referred to reference data for grade determination, and the external appearance grade is determined.

The external appearance of the terminal that is imaged by the camera for grade determination ranges up to a total of ten locations (ten surfaces): a front surface, a back surface, a left side surface, a right side surface, an upper surface, a lower surface, and four corner portions of the terminal. Therefore, if the imaging system includes one camera, it has been necessary to hold the terminal in a gripping means such as a robot hand and change the posture of the terminal from a horizontal posture to a posture inverted by 180 degrees, a posture rotated 90 degrees in the forward and reverse directions, a posture inverted in the up-down direction, or the like. The necessity of changing the posture is also the same in the external appearance inspection of newly manufactured terminals.

However, the mechanism for changing the posture of the terminal and the operation and movement that change the posture require a certain amount of time. As a result, it takes too much time to acquire image data for ten surfaces of the terminal, and it is currently not possible to acquire image data for the external appearance inspection of the terminal efficiently and economically.

CITATION LIST

Patent Literature

[Patent Literature 1]
Japanese Translation of PCT International Application Publication No. 2022-539909

[Patent Literature 2]
Japanese Translation of PCT International Application Publication No. 2022-539912

SUMMARY OF INVENTION

Technical Problem

Therefore, it is an object of the present invention to provide a method and an apparatus for reasonably acquiring image data for external appearance inspection of not only used terminals but also newly manufactured terminals.

In this description, in a state in which a substantially rectangular terminal is placed horizontally, the left and right directions of the terminal are defined as left and right, the up and down directions thereof are defined as front and rear, and the perpendicular directions thereof are defined as up and down.

Solution to Problem

A configuration of a method of the present invention for solving the above object includes: using a camera being placed to face a front surface or a back surface of a terminal placed for imaging; capturing images of both left and right side surfaces, an upper surface, and upper left and right corner portions of the terminal, and simultaneously imaging the front surface or the back surface of the terminal, and thereby acquiring image data of the front surface or the back surface of the terminal, both the left and right side surfaces, the upper surface, and the upper left and right corner portions of the terminal, with the camera, the images being reflected in mirrors, the mirrors respectively corresponding to both the left and right side surfaces, the upper surface, and the upper left and right corner portions of the terminal, the mirrors each being arranged with a reflective surface being inclined outward with respect to an optical axis of a photographing lens of the camera; and inverting the placed terminal in its up-down direction after the imaging, and imaging the terminal in this posture using the camera, and thereby acquiring image data of the back surface or the front surface of the terminal, a lower surface, and lower left and right corner portions of the terminal.

In the above method, a posture of the terminal placed for imaging can be selected from among a horizontal posture, a vertical posture, and an intermediate posture between these two postures. In the apparatus of the present invention described below, an apparatus will be described in which the terminal is placed in a horizontal posture.

The configuration of the apparatus of the present invention for carrying out the above method of the present invention includes: a base board that includes a mounting table allowing a terminal to be placed in a horizontal posture; an erection frame section that is erected on the base board, so as to surround the mounting table; a camera that is arranged in an upper part of the erection frame section and has a lens directly facing the terminal; an illuminating device arranged around the camera so as to radiate illumination light toward the terminal; mirrors provided at parts on the base board, each mirror having a reflective surface inclined outward with respect to an optical axis of the lens of the camera, the parts respectively corresponding to both left and right side surfaces, an upper surface, and upper left and right corner portions with respect to the terminal placed on the mounting table in a horizontal posture; and a light-shielding member that is disposed on the erection frame section and surrounds the erection frame section in a darkroom-like manner, wherein the camera images a front surface or a back surface, and captures images of: both the left and right side surfaces, the upper surface, and the upper left and right corner portions of the terminal, the images being reflected in the respective mirrors while the illuminating device is in operation and the illumination light is controlled for the terminal placed on the mounting table in the horizontal posture, and the camera images the terminal that is inverted in an up-down direction on the mounting table.

Here, the camera may be a normal film camera, but a digital camera equipped with a wide-angle lens is suitable for handling and processing the image data. In addition, the angle of each mirror inclined outward with respect to the camera optical axis (vertical) is preferably substantially 45 degrees from the optical axis. Furthermore, in imaging in a posture with the front surface of the terminal facing upward, and in imaging in a posture with the back surface of the terminal facing upward, it is desirable, in order to ensure determination accuracy, to perform imaging at least twice for every surface to acquire image data for each surface of the terminal. Note that, in description below, the camera will be described as a digital camera.

In the above apparatus of the present invention, when a camera captures images, for example, when a camera captures images of a terminal placed on a mounting table with its screen made of a liquid crystal or the like (front surface) facing upward, the action of the mirrors placed so as to surround both the left and right sides, the upper side, and the upper left and right corner portions of the mounting table makes it possible to obtain image data of both the left and right side surfaces, the upper surface, and the upper left and right corner portions of the terminal, as well as image data of the front surface of the terminal. The camera has not yet captured images of the back surface, lower surface, and lower left and right corner portions of the terminal.

Then, in order to capture images of the back surface, lower surface, and lower left and right corner portions of the terminal with the camera, the terminal is lifted from the mounting table by hand, rotated 180 degrees in the up-down direction of the terminal, and placed again on the mounting table in this posture. In this way, the terminal is turned over and placed on the mounting table with its back surface facing upward. Therefore, the lower surface of this terminal, which has not been imaged, now faces the upper mirror, and the lower left and right corner portions now face the upper left and right corner mirrors. This allows imaging of the terminal in this orientation with the camera to obtain image data of the back surface, lower surface, and lower left and right corner portions of the terminal. Note that this imaging of the back surface of the terminal also obtains image data of both the left and right side surfaces of the terminal, but it is optional whether or not to use the image data of both the left and right side surfaces.

In capturing an image with a digital camera, the image of each surface of the terminal is converted into electrical signals by the light receiving surface (CCD, etc.) of the digital camera, and the signals are processed by a processing circuit such as an LSI and saved as a digital image file on a recording medium. In this case, the image data for each surface of the terminal has a location on the light receiving surface specified by digital data. This allows the first imaging to obtain image data of six surfaces of the terminal, which are the front surface or back surface, both the left and right side surfaces, the upper surface, and the upper left and right corner portions.

When the terminal, image data of which regarding the front side has been acquired in the first imaging as described above, is inverted in the up-down direction on the mounting table, the back surface faces upward and the lower surface comes to the original upper surface position. Therefore, imaging with the camera in this turned over posture makes it possible to acquire image data regarding four surfaces of the terminal, which are the back surface, the lower surface, and the lower left and right corner portions, that is, the image data regarding the back side of the terminal.

According to the apparatus that performs the method of the present invention, performing two times of imaging operation on the terminal set on the mounting table makes it possible to acquire image data of ten surfaces of the terminal (the front surface, the back surface, both the left and right side surfaces, both the upper and lower surfaces, and the four upper and lower corner portions).

Advantageous Effect of Invention

In the present invention, it is possible to acquire image data of ten surfaces (ten locations) of a terminal, which are a front surface, a back surface, both left and right side surfaces, both upper and lower surfaces, and four corner portions, just through at least two times of operation of imaging a terminal with a camera and operation of inverting a terminal in its up-down direction in that orientation by: using a camera being placed to face a front surface or a back surface of a terminal placed for imaging; capturing images of both left and right side surfaces, an upper surface, and upper left and right corner portions of the terminal, and simultaneously imaging the front surface or the back surface of the terminal, and thereby acquiring image data of the front surface or the back surface of the terminal, both the left and right side surfaces, the upper surface, and the upper left and right corner portions of the terminal, with the camera, the images being reflected in mirrors, the mirrors respectively corresponding to both the left and right side surfaces, the upper surface, and the upper left and right corner portions of the terminal, the mirrors each being arranged with a reflective surface being inclined outward with respect to an optical axis of a photographing lens of the camera; and inverting the placed terminal in its up-down direction after the imaging, and imaging the terminal in this posture using the camera, and thereby acquiring image data of the back surface or the front surface of the terminal, a lower surface, and lower left and right corner portions of the terminal.

DESCRIPTION OF EMBODIMENTS

Figure 1:
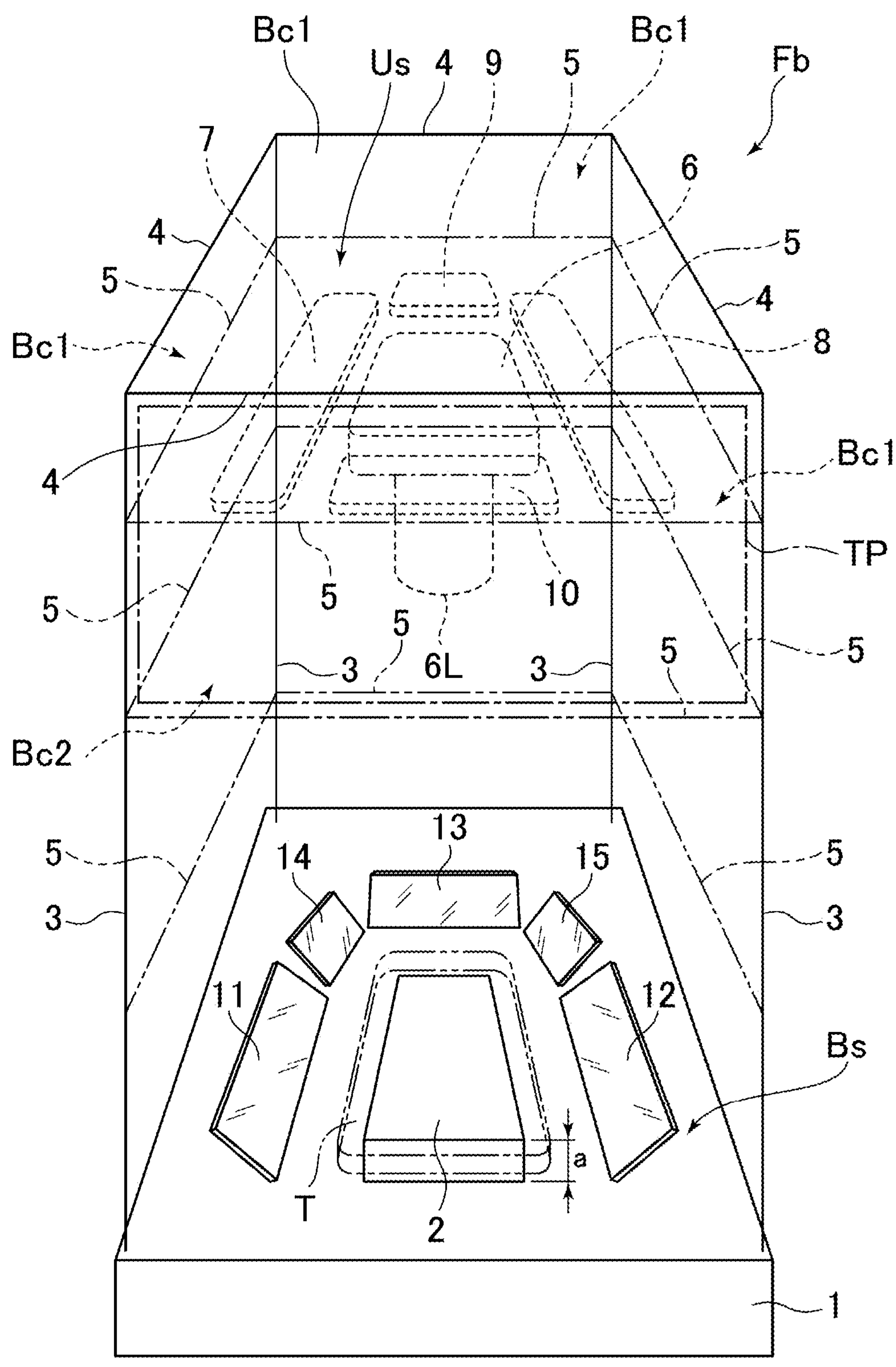
FIG. 1 is a transparent perspective view for describing a configuration of an example of an apparatus of the present invention.
Figure 2:
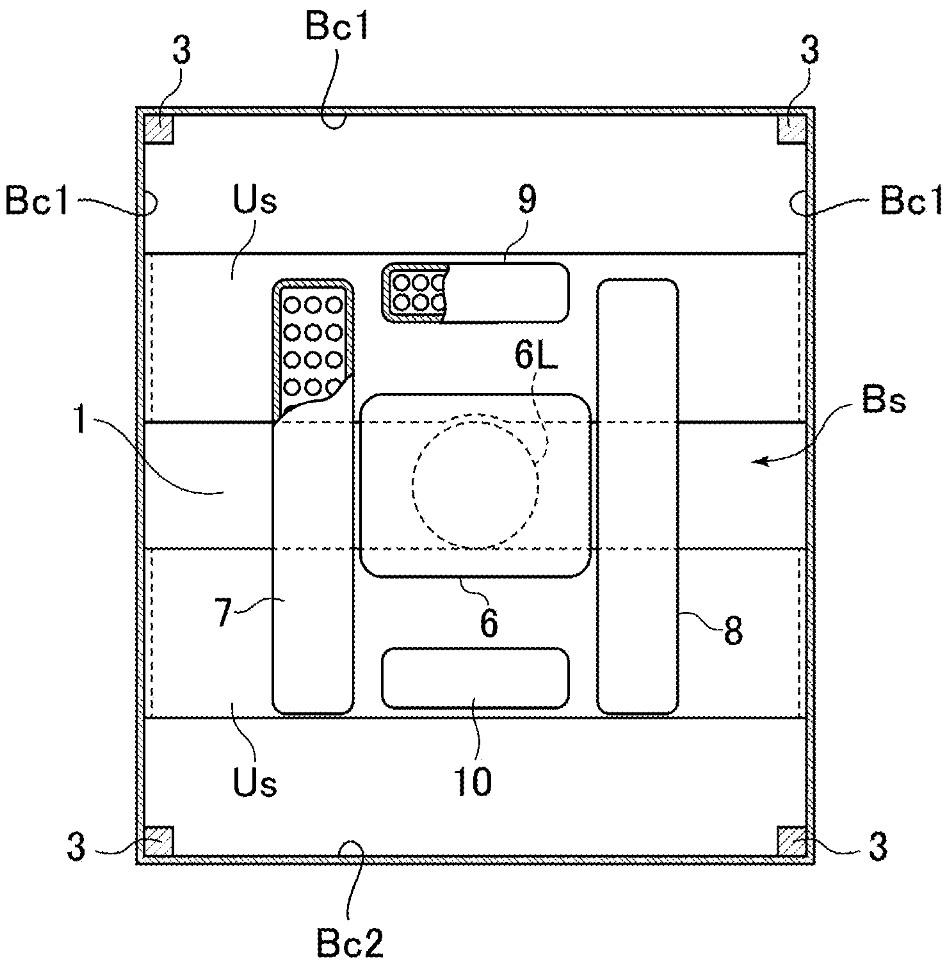
FIG. 2 is a plan view for describing a configuration (an arrangement of a camera and an illuminating device) of an upper half side of an erection frame of the apparatus of the present invention in FIG. 1.
Figure 3:
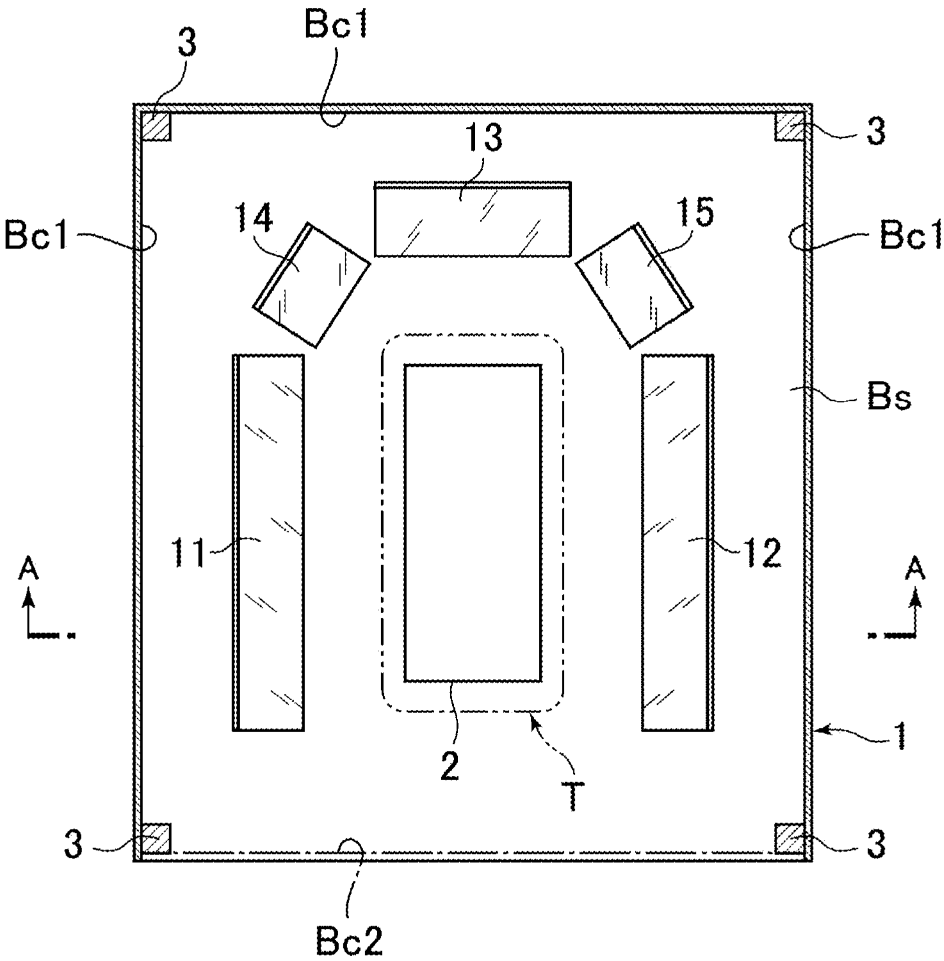
FIG. 3 is a plan view for describing a configuration (arrangement of a mounting table and mirrors) on a base board of the apparatus of the present invention shown in FIG. 1.
Figure 4:
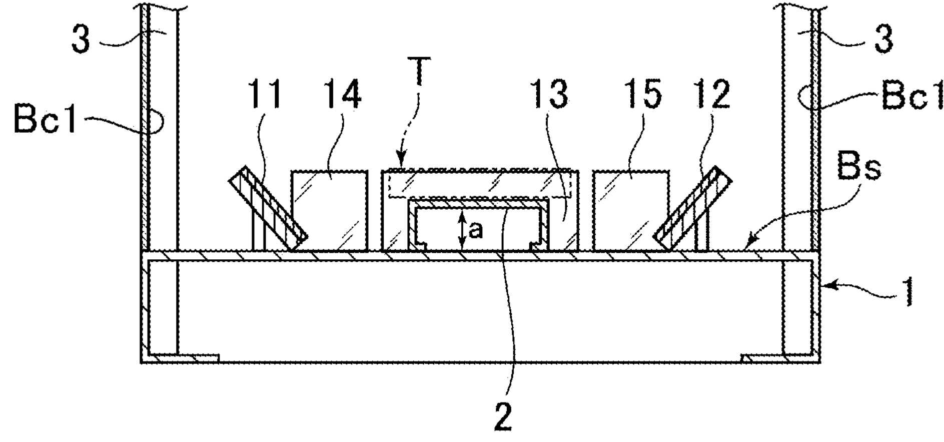
FIG. 4 is a view taken along a line A-A in FIG. 3.

Embodiments of the present invention will be described with reference to the drawings.

In the figure, a reference numeral 1 denotes a base board having a rectangular shape close to a square in a plan view.

A mounting table 2 on which a terminal T is placed is provided substantially at the central position of the base board 1.

Here, the mounting table 2 has a height such that its lower surface is higher by a short distance a (about to 30 mm as an example) from the upper surface of the base board 1, and has a shape that is about one size smaller than the outer shape of a typical terminal T. In the base board 1, the left and right directions are left and right, the front and rear directions are front and rear, and the up and down directions are up and down.

In the present invention, the planar shape of the base board 1 and the mounting table 2 is not limited to a rectangular shape, and may be any other planar polygonal shape, or a circular, oval or elliptical shape.

Reference numerals 3 denote four columnar bodies erected respectively at the four corners of the base board 1. The adjacent columnar bodies 3 are joined at their upper ends by beam members 4, and the intermediate portions of the columnar bodies 3 are joined by intermediate beams 5 except for the front side in a front view of the base board 1, thereby forming an erection frame Fb. Note that even on the front side of the erection frame Fb, the intermediate beam 5 is provided on the upper half side. In addition, there is also an erection frame Fb having the four columnar bodies 3, in a plan view, provided with: panel bodies (not shown) each stretched between adjacent columnar bodies 3, 3 except for the front surface; and a panel body (not shown) stretched on the front surface of the erection frame Fb over the upper half side of the left and right columnar bodies 3, 3. In the case of the panel type, the intermediate beams 5 are required just for the upper stage Us on which the camera 6 and illuminating devices 7 to 10 are arranged, and any other intermediate beam 5 is not required.

The erection frame Fb has the upper stage Us, formed in the part surrounded by the intermediate beams 5 on the upper half side, on which there are arranged: a camera (digital camera) 6 including a wide-angle lens 6L; and four illuminating devices 7, 8 and 9, 10, each of which has a plurality of LEDs as light sources, respectively on the left and right sides and the rear and front sides surrounding the camera 6.

Here, the camera 6 is a commercially available digital camera including a wide-angle lens 6L, and the left and right illuminating devices 7 and 8 each have a longer shape than the front and rear illuminating devices 9 and 10, and have a larger number of LED light sources. This is because the devices follow the planar shape (vertically long rectangle) of the terminal T to be illuminated.

The performance, size, arrangement, etc. of the camera 6 and illuminating devices 7 to 10 in the present invention are merely examples, and are not limited thereto. Here, the camera 6 can be set automatic regarding each of its on, off, aperture, focus and shutter speed, and can be controlled remotely. In addition, the illuminating devices 7 to 10 can also be set automatic regarding its on, off, adjustment of illumination, etc., and can be controlled remotely. Although not shown in the drawings, a control section related to the functions of the camera 6 and the illuminating devices 7 to 10 may be arranged on the upper stage Us where the camera 6 and the illuminating devices 7 to 10 are arranged. In the present invention, operation control of the camera 6 and illuminating devices 7 to 10, instructions for the position of the terminal T placed on the mounting table 2, etc. may be performed by a separately installed control section including a personal computer (hereinafter referred to as PC). A touch panel TP having a monitor function of performing input to the control section, displaying the control status, etc. is arranged on the front upper-half side of the erection frame Fb as an input/output section of the control section (or PC).

On the other hand, in the area around the mounting table 2 of the base board 1 forming the lower stage Bs, there are installed left and right mirrors 11 and 12, an upper mirror 13, and left and right corner mirrors 14 and respectively corresponding to the left and right side surfaces, the upper surface, and the upper left and right corner portions of the terminal T placed on the mounting table 2.

The left and right mirrors 11 and 12 are placed in a posture inclined outward of the left and right, at positions corresponding to the left and right side surfaces of the terminal T placed on the mounting table 2, in which the reflective surfaces (mirror surfaces) of the mirrors 11 and 12 are each adjusted and set at an angle between substantially 40 degrees and 60 degrees with respect to the optical axis of the lens 6L of the camera 6.

The mirror 13 for the upper surface is placed in a posture inclined outward of the upper side, at a position corresponding to the upper surface of the terminal T placed on the mounting table 2, in which the reflective surface (mirror surface) of the mirror 13 is adjusted and set at an angle between substantially 40 degrees and 60 degrees with respect to the optical axis of the lens 6L of the camera 6.

The mirrors 14 and 15 for the upper left and right corner portions are placed in a posture inclined outward of the upper corner portions, at positions corresponding to the upper left and right corner portions of the terminal T placed on the mounting table 2, in which the reflective surfaces (mirror surfaces) of the mirrors 14 and 15 are each adjusted and set at an angle between substantially 40 degrees and 60 degrees with respect to the optical axis of the lens 6L of the camera 6.

Here, the inclination angles of the mirrors 11 to 15 are set in consideration of, for example, the horizontal distances of the respective mirrors corresponding to the portions of the terminal T, the magnitude of the angle of view of the wide-angle lens 6L of the camera 6, etc.

Although the arrangement of the mirrors 11 to 15 shown in FIG. 1 is substantially in an inverted U-shape in a plan view, the arrangement of the mirrors 11 to 15 may be substantially in a laterally facing U-shape or substantially in an erect U-shape. In this case, the arrangement of the illuminating devices 7 to 10 and the orientation of the mounting table 2 are changed in accordance with the arrangement direction of the mirrors 11 to 15.

The erection frame Fb, which includes: a camera 6 and illuminating devices 7 to 10 on the upper stage Us; and a mounting table 2 and mirrors 11 to 15 on the lower stage Bs, is provided with light-shielding members Bc1 on three side surfaces except the lower half of the front surface and on the ceiling, and is provided with a light-shielding member Bc2 that is retractable in the up-down direction at the upper half of the front surface, so that the inside of the erection frame Fb is formed into a substantially closed imaging space with the front surface lower half being open. The opening/closing direction of the light-shielding member Bc2 is optional. Note that the touch panel TP is provided on the front surface of the light-shielding member Bc2. The touch panel TP can also be provided as a light-shielding member Bc2. The material of the light-shielding members Bc1 and Bc2 can be freely selected from a panel-like hard material to a cloth-like soft material. Here, it is desirable that the inside of the imaging section be a light-diffuse-reflection-surface. This is for evenly illuminating the terminal T to be illuminated.

If there is a retractable light-shielding member Bc2, operation such as placing the terminal T on the mounting table 2, inverting it, or taking it out is performed with the light-shielding member Bc2 being opened, and imaging is performed with the light-shielding member Bc2 being closed at the time of imaging. In the type in which the front lower-half side of the imaging space is opened, the light-shielding member Bc2 does not need to be opened or closed. The imaging state in the imaging space is displayed on the touch panel TP serving as an external monitor with the video function of the camera 6.

In the present invention, the mirrors 11, 12, 13, 14, and 15 are arranged around the mounting table 2 with the above-mentioned inclination angles. Therefore, when the terminal T is placed on the mounting table 2 in a horizontal posture with the front surface facing upward, and when the terminal T is aimed with (brought into focus of) the camera 6 on the upper stage Us and the shutter is released, the light receiving surface of the camera 6 receives light of an image of the surface of the terminal T (surface image) at the center of the angle of view. Simultaneously, the light receiving surface receives light of images of the left side surface and the right side surface of the terminal T respectively on the left side and the right side of this surface image, receives light of an image of the upper surface of the terminal T on the upper side of this surface image, and receives light of images of the upper left and right corner portions of the terminal T respectively on the upper left and right of this surface image.

In other words, the apparatus of the present invention can acquire image data of the front surface (or back surface), both the left and right side surfaces, the upper surface, and the upper left and right corner portions of the terminal T simultaneously in a single shot of the camera 6.

Next, when the image data regarding the front side of the terminal T is obtained as described above, the terminal T is inverted in the up-down direction of the terminal T on the mounting table 2 and the camera 6 performs imaging in this posture. Thereby, there can be obtained the image data of the back surface, lower surface, and the lower left and right corner portions of the terminal T.

In the present invention, the above two shots make it possible to acquire image data of a total of ten surfaces of the terminal T, which are the front surface, the back surface, both the left and right side surfaces, both the upper and lower surfaces, and the corner portions of four corners. Therefore, the image data necessary for the external appearance inspection of the terminal can be obtained with easy and simple operation.

In reality, it is desirable to: change the illuminance of the illuminating devices 7 to 10 as appropriate; capture at least two shots of the images of the front side of the terminal T; and subsequently invert this terminal T and capture at least two shots of the images of the back side of the terminal T. This is for improving the determination accuracy regarding the external appearance of the terminal T.

The image data of the ten surfaces of the terminal T obtained by the above imaging is sent to a grade determination section (not shown). Then, the image data is referred to reference data for grade determination in accordance with the handling manual for each image data, and used for determination of the external appearance grade of this terminal T.

The following describes an example of the procedure and form of the terminal T external appearance inspection actually performed by the apparatus of the present invention described above in steps S1 to S9.

S1: Wipe away fingerprints on the surface of the terminal T with cleaning paper or the like. This is for preventing fingerprints from being imaged as fine scratches.

S2: Input the management number (or scanned QR code (registered trademark), etc.) of the terminal T into the control section from the touch panel TP (or the keyboard of the PC).

S3: Control the output of the illuminating devices and select the size of the red frame marker of the mounting position displayed on the mounting table on the touch panel screen, depending on the external form of the terminal (whether it has a bezel or not, and if so, whether it is white or black) and size.

S4: Start operation of the camera 6. Display check items (cleaned? and power off?) on the touch panel TP. Check the corresponding items and press "checked".

S5: When the check is completed, a red frame marker is displayed on the mounting table displayed on the touch panel TP, and the shutter operation of the camera 6 is counted down (for five seconds, but the setting can be changed freely).

S6: Now, place the terminal T on the red frame marker on the mounting table 2 with the front (screen side) of the terminal T facing up while observing the monitor.

Then, the shutter of the camera 6 is released and imaging is performed. With this imaging, imaging of the front surface, the left and right side surfaces, the upper surface, and the upper left and right corner portions of the terminal T is completed.

S7: Execute S4 and S5 described above for the back surface of the terminal T and place the terminal T on the mounting table with the back surface facing up and imaging is performed, then, imaging of the back surface, the left and right side surfaces, the lower surface, and the lower left and right corner portions is completed.

S8: The image data of a total of ten surfaces of the terminal T acquired as above, which are the front surface, the back surface, the left and right side surfaces, both the upper and lower surfaces, and the corner surfaces of the four corners, is sent to a grading determination section that is within the PC or separately installed; the grading is determined; and the determination result is saved, and displayed on the monitor of the touch panel TP.

S9: Here, the terminal T is taken out from the mounting table 2 and the external appearance inspection is completed.

INDUSTRIAL APPLICABILITY

The present invention is as described above, and makes it possible to acquire image data for the external appearance inspection of a terminal easily and in a short time with an apparatus having a simple structure and a simple operation. This can greatly contribute to streamlining and automating external appearance inspection of terminals.

REFERENCE SIGNS LIST

T terminal
Bs lower stage
1 base board
2 mounting table
Fb erection frame
3 columnar body
4 beam member

5 intermediate beam
Us upper stage
6 camera
6L wide-angle lens
7-10 illuminating device
11-15 mirror
Bc1, Bc2 light-shielding member
TP touch panel

The invention claimed is:

1. A method for external appearance inspection of a terminal, comprising:

using a camera being placed to face a front surface or a back surface of a terminal placed for imaging;

capturing images of both left and right side surfaces, an upper surface, and upper left and right corner portions of the terminal, and simultaneously imaging the front surface or the back surface of the terminal, and thereby acquiring image data of the front surface or the back surface of the terminal, both the left and right side surfaces, the upper surface, and the upper left and right corner portions of the terminal, with the camera, the images being reflected in mirrors, the mirrors respectively corresponding to both the left and right side surfaces, the upper surface, and the upper left and right corner portions of the terminal, the mirrors each being arranged with a reflective surface being inclined outward with respect to an optical axis of a photographing lens of the camera; and inverting the placed terminal in its up-down direction after the imaging, and imaging the terminal in this posture using the camera, and thereby acquiring image data of the back surface or the front surface of the terminal, a lower surface, and lower left and right corner portions of the terminal.

2. The method for external appearance inspection according to claim 1, wherein inclination angles of the mirrors are each an angle adjusted and set between substantially 40 degrees and 60 degrees outward with respect to the optical axis of the lens of the camera.

3. The method for external appearance inspection according to claim 1, wherein the terminal is illuminated by an illuminating device provided around the camera and the terminal is imaged.

4. The method for external appearance inspection according to claim 1, wherein the terminal is manually placed and manually inverted.

5. An apparatus for external appearance inspection of a terminal, comprising:

a base board that includes a mounting table allowing a terminal to be placed in a horizontal posture;

an erection frame section that is erected on the base board, so as to surround the mounting table;

a camera that is arranged in an upper part of the erection frame section and has a lens directly facing the terminal;

an illuminating device arranged around the camera so as to radiate illumination light toward the terminal;

mirrors provided at parts on the base board, each mirror having a reflective surface inclined outward with respect to an optical axis of the lens of the camera, the parts respectively corresponding to both left and right side surfaces, an upper surface, and upper left and right corner portions with respect to the terminal placed on the mounting table in a horizontal posture; and a light-shielding member that is disposed on the erection frame section and surrounds the erection frame section in a darkroom-like manner, wherein the camera images a front surface or a back surface, and captures images of: both the left and right side surfaces, the upper surface, and the upper left and right corner portions of the terminal, the images being reflected in the respective mirrors while the illuminating device is in operation and the illumination light is controlled for the terminal placed on the mounting table in the horizontal posture, and the camera images the terminal that is inverted in an up-down direction on the mounting table.

6. The apparatus for external appearance inspection according to claim 5, wherein inclination angles of the mirrors are each an angle adjusted and set between substantially 40 degrees and 60 degrees outward with respect to the optical axis of the lens of the camera.

7. The apparatus for external appearance inspection according to claim 5, wherein an upper surface of the base board and an inner surface of the light-shielding member are formed into light-diffuse-reflection-surfaces.

8. The apparatus for external appearance inspection according to claim 5, wherein a touch panel with a monitor function is provided on a front surface of the erection frame section as an input/output device of a control section for the camera and the illuminating device.

* * * * *